US007359495B2

(12) United States Patent
Chan et al.

(10) Patent No.: US 7,359,495 B2
(45) Date of Patent: Apr. 15, 2008

(54) METHOD AND APPARATUS FOR UNIFORM OPERATIONAL ACCESS ACROSS MULTIPLE INFORMATION SYSTEMS

(75) Inventors: Kevin Chan, Ryde (AU); Neil Hepworth, Artarmon (AU); Melanie Louise Smith, Balmain (AU)

(73) Assignee: Avaya Technology Corp., Basking Ridge, NJ (US)

( * ) Notice: Subject to any disclaimer, the term of this patent is extended or adjusted under 35 U.S.C. 154(b) by 644 days.

(21) Appl. No.: 10/923,489

(22) Filed: Aug. 20, 2004

(65) Prior Publication Data

US 2006/0050855 A1  Mar. 9, 2006

(51) Int. Cl.
*H04M 3/42* (2006.01)
(52) U.S. Cl. .................. 379/201.01; 379/67.1
(58) Field of Classification Search ............... 379/67.1, 379/74, 88.16, 88.17, 88.18, 201.01, 93.01, 379/93.12
See application file for complete search history.

(56) References Cited

U.S. PATENT DOCUMENTS

| 5,243,643 | A | * | 9/1993 | Sattar et al. | ............. 379/88.23 |
| 6,229,880 | B1 | * | 5/2001 | Reformato et al. | ...... 379/88.01 |
| 2005/0047559 | A1 | * | 3/2005 | Colson et al. | ........... 379/88.18 |

* cited by examiner

*Primary Examiner*—Olisa Anwah
(74) *Attorney, Agent, or Firm*—John C. Moran

(57) ABSTRACT

A method and apparatus for determining operational preferences for a user access to a plurality of telecommunication response systems designating by the user that user operations of one of the plurality of telecommunication response systems will be the operational preferences of the user for all of the plurality of telecommunication response systems; storing the operational preferences for the user; accessing the stored operational preferences by a second one of the plurality of telecommunication response systems for use in communicating with the user during interactions with the user by the second one of plurality of telecommunication response systems; and interpreting user operations by the second one of plurality of telecommunication response systems using the accessed operational preferences.

32 Claims, 5 Drawing Sheets

METHOD AND APPARATUS FOR UNIFORM OPERATIONAL ACCESS ACROSS MULTIPLE INFORMATION SYSTEMS

TECHNICAL FIELD

The present invention relates to operational access of multiple information systems that individually have different access operations.

BACKGROUND OF THE INVENTION

Within a similar type of information systems, different manufacturers may have different access operations to obtain or remove the same information. For example, voice mail systems which are controlled either by voice commands or dual-tone multi-frequency (DTMF) tones have varying access operations between different manufacturers, and one manufacturer may not maintain a consistent set of access operations for generations of their voice mail systems. Initially, this was not a problem for the majority of people since most people had at most one voice mail system to interact with. Now with the proliferation of voice mail systems for residential wired lines, cellular/mobile telephone service, and business based voice messaging systems, the average person is faced with having to contend with three or more different voice mail systems on almost a daily basis. This requires the user to remember three different sets of operations to do even simple tasks. Other informational system types also suffer from this type of problem. The end result normally is that the user of these informational systems limits themselves to one or two different operations simply so that they don't have to memorize three different sets. This results in low efficiency of use of these informational systems.

SUMMARY OF THE INVENTION

A method and apparatus for determining operational preferences for a user access to a plurality of telecommunication response systems designating by the user that user operations of one of the plurality of telecommunication response systems will be the operational preferences of the user for all of the plurality of telecommunication response systems; storing the operational preferences for the user; accessing the stored operational preferences by a second one of the plurality of telecommunication response systems for use in communicating with the user during interactions with the user by the second one of plurality of telecommunication response systems; and interpreting user operations by the second one of plurality of telecommunication response systems using the accessed operational preferences.

DETAILED DESCRIPTION

Figure 1:
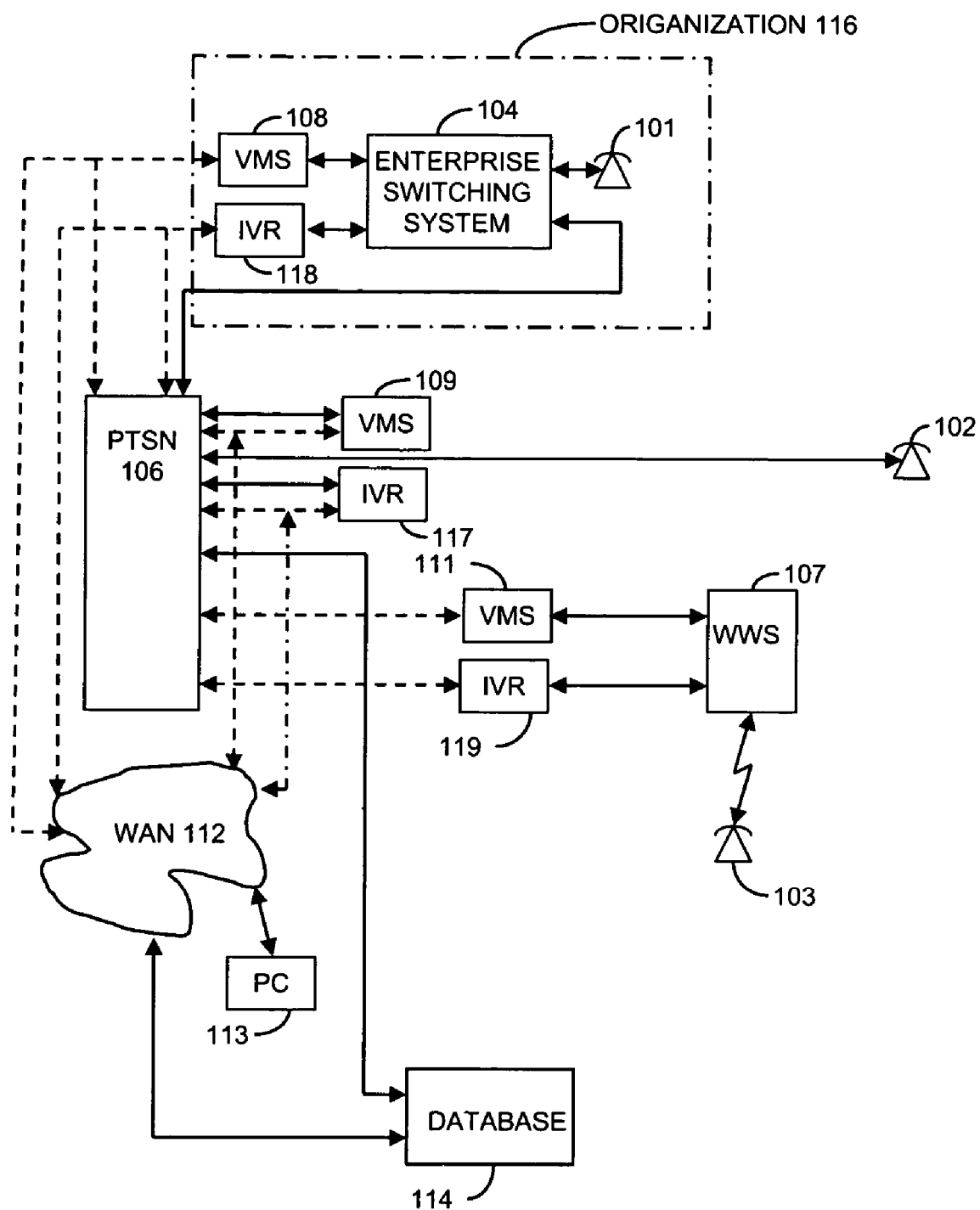
FIG. 1 illustrates an embodiment for implementing the invention.

FIG. 1 illustrates an embodiment for implementing the invention. Voice mail system 108 provides voice mail support for enterprise switching system 104. Voice mail system 109 provides voice mail support for public telephone switching network 106. In general, there would be a plurality of voice mail systems providing support for public telephone switching network 106; but in general, there would only be one voice mail system associated with the public telephone switching network for each user. Voice mail system 111 is providing voice mail support for wireless switching system 107. Voice mail systems normally provide an user interface by implementing interactive voice response functions although other types of user interfaces to voice mail systems are known to ones skilled in the art. Another type of telecommunication response system illustrated in FIG. 1, is interactive voice response systems 118-119 that provides interactive voice response functions for systems other than voice mail systems. Interactive voice response system 117 provides the voice response functions for public telephone switching network 106. One skilled in the art would readily realize that there could be a plurality of information voice response units attached to any of the switching systems (104, 106 and 107) illustrated in FIG. 1. Interactive voice response unit 118 provides support for the enterprise switching system 104, and interactive voice response unit 119 provides support for wireless switching system 107.

A user can access the voice mail systems 108-111 via telephone sets 101-103. Within FIG. 1, it is assumed that one user is assigned telephones 101-103. In general, any of the telephones can be utilized to access any of the voice mail systems as is well know to those skilled in the art. When a voice mail system such as voice mail system 109 is accessed by a user, voice mail system 109 interrogates database 114 to obtain the operational preferences of the user. The interconnection between a voice mail system and database 114 may be done in a variety of ways. For example, it may be through the public telephone switching network 106 (as illustrated by dashed lines), wide area network 112 (as illustrated by dashed lines), or other mechanisms. Database 114 transmits the user's preference information to voice mail system 109 which then uses this information to interpret and respond to multi-frequencies tones or voice commands being received as the user performs various access operations. Voice mail system 109 uses the preference information to translate the received tones or commands to accomplish the access operations desired by the user.

The user establishes their preference information in database 114 by utilizing an input device such as personal computer 113 to tailor their operational preference information in database 114. In one embodiment, the information is stored in database 114 utilizing the expert markup language (XML). FIG. 1 illustrates personal computer 113 being interconnected to database 114 via WAN 112; however, one skilled in the art can envision a variety of ways that personal computer 113 could be interconnected to database 114. In other embodiments, the user does not utilize personal computer 113 or any personal computer, but rather could use various devices such as a cellular phone (such as cellular phone 103), a personal digital assistant (PDA), or other devices known to those skilled in the art. Telephone 101, enterprise switching system 104, and voice mail system 108 are assumed to be part of organization 116 and may be located on one or more physical locations controlled by this organization. The organization may be a corporation, government agency, university, etc.

Database 114 is shown to be one entity in FIG. 1; however, database 114 could be a distributed database. Indeed, database 114 could be incorporated into one of the voice mail systems. In another embodiment, database 114 is not one database but rather a plurality of databases. The user specifies the voice mail systems being used by the user when they utilize personal computer 113 to enter information. After finishing entering their operational preferences, the user then actuates the database to contact the voice mail systems that the user is utilizing and to inform the voice mail systems of the location of the operational preference information. The database may also immediately transfer the resulting state table defining the preference information to each of the voice mail systems or the voice mail systems may request it when the state table is needed. In another embodiment, the user will utilize a telephone such as telephone set 101 to inform the voice mail system such as voice mail system 108 of which database should be utilized for obtaining the operational preference information. In yet another embodiment, personal computer 113 directly distributes the operational preference information to the voice mail systems and the information is not stored in a database such as database 114. In yet another embodiment, personal computer 113 internally stores the operational preference information hence is the database 114 for that particular user. In an embodiment, a vendor controlling a voice mail system such as system 109 may establish database 114 on a server or internal to the voice mail system to be utilized by other voice mail systems simply to promote the use of voice mail system 109. Indeed the vendor controlling voice mail system 109 may charge for this service. In addition, a Regional Bell Operating Company may establish database 114 that could be accessed from a variety of geographical locations and also charge a fee for the users to utilize the database. In addition, the database may be established by one of the large Internet provider services such as America Online or Earthlink to promote the utilization of their Internet service. In which case, the user would access their operational preference data via the Internet such that WAN 112 would actually be the Internet itself.

Figure 2:
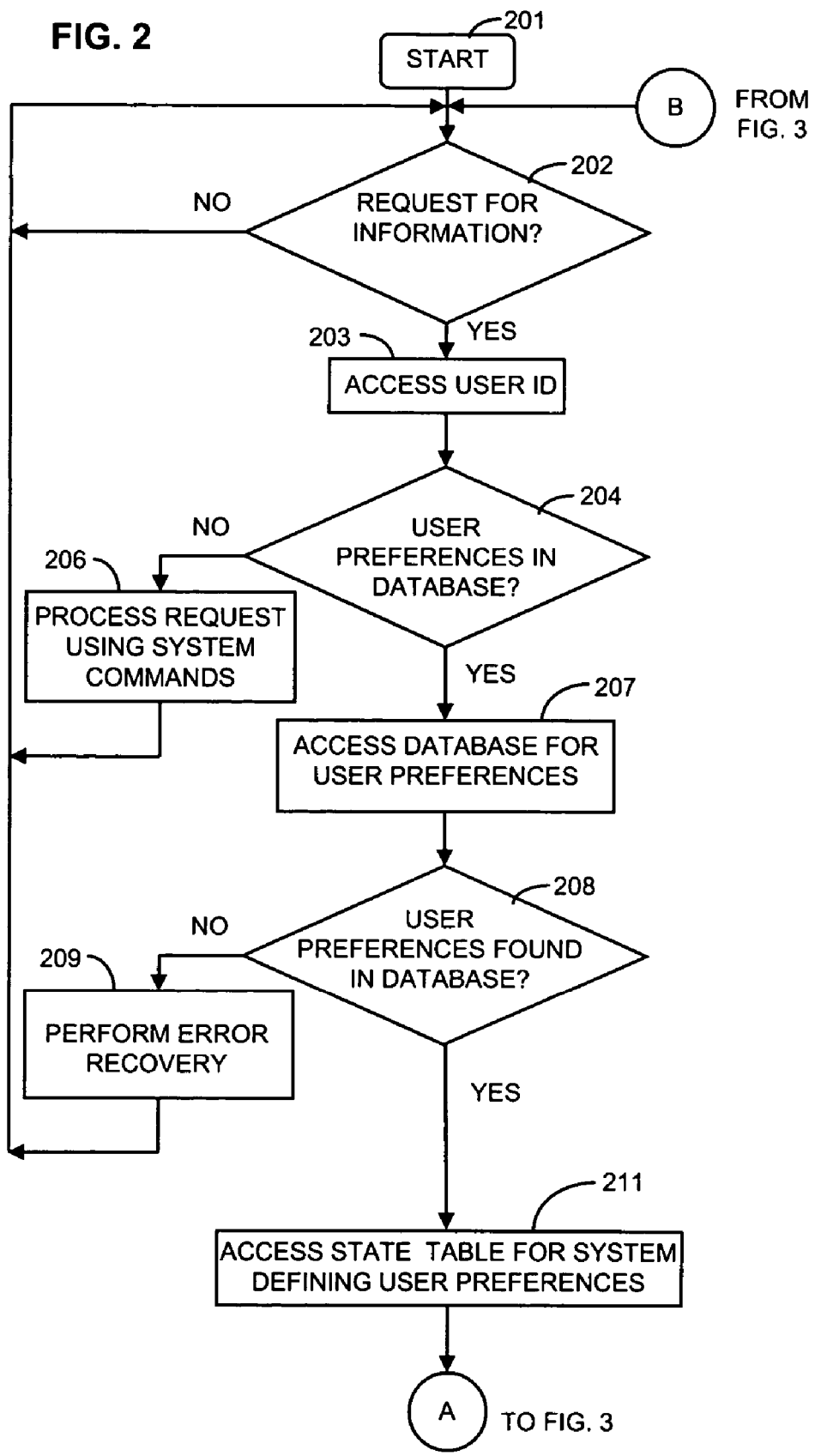
FIGS. 2 and 3 illustrate, in flowchart form, operations performed by an embodiment of an information system.
Figure 3:
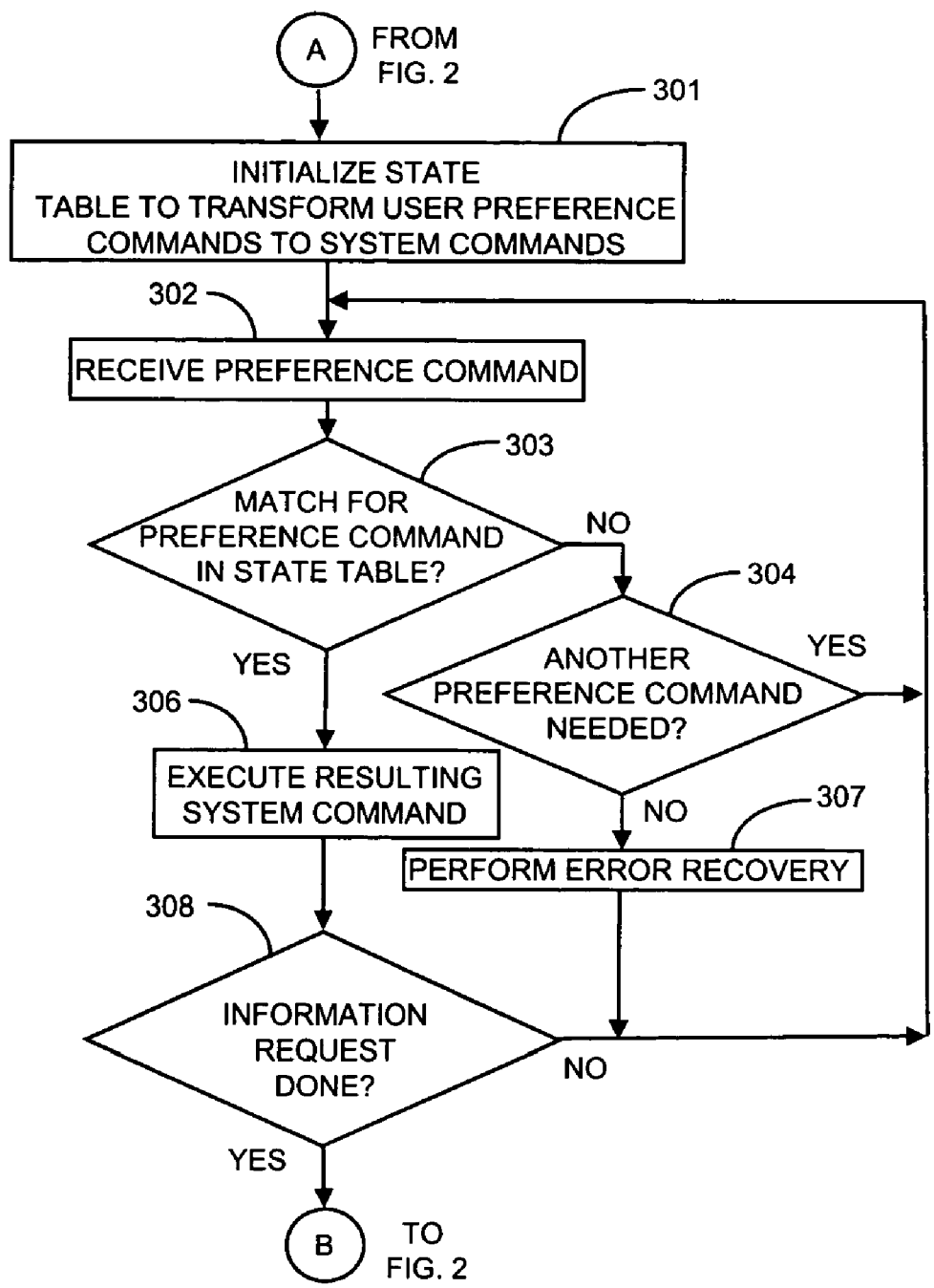

FIGS. 2 and 3 illustrate the operations performed by an embodiment of an information system such as a voice messaging system or an interactive voice response system. In FIG. 1, such a system could be one of the voice mail systems 108-111 or one of the interactive voice response systems 117-119. Once started in block 201, the information system determines if it is receiving a request for information in decision block 202. If the answer is no, decision block 202 is re-executed. If the answer is yes in decision block 202, the information system accesses in block 203 the user ID that the information system has stored for the user before transferring control to decision block 204. The latter decision block accesses a database such as database 114 to determine if the user has preferences stored within the database. If the answer is no, the information system attempts to process the information request using the normal system commands of the information system before transferring control back to decision block 202.

If the answer in decision block 204 is yes, block 207 accesses the database for the user's preferences. Decision block 208 then determines if the user's preferences were found within the database. If the answer is no, block 209 performs error recovery before transferring control back to decision block 202. If the answer in decision block 208 is yes, block 211 accesses the state table for the information system defining the user's preferences. Note, if the preferred information system is the information system executing FIGS. 2 and 3, the state table access will simply do a one for one mapping of the preference commands received from the user into those of the information system. In addition, the user can create a state table defining different preferences that can also be stored in the information system. One skilled in the art could readily envision how the user could create such a table using operations described in U.S. patent application Ser. No. 10/736,923, filed Dec. 15, 2003 and assigned to the same assignee as the present application. U.S. patent application Ser. No. 10/736,923 is hereby incorporated by reference.

After execution of block 211, control is transferred to block 301 of FIG. 3. Block 301 initializes the state table to transform the user preference commands to the system commands utilized by the information system executing the operations of FIGS. 2 and 3. After execution of block 301, block 302 receives the first command from the user which is called a preference command. After the preference command is received, decision block 303 determines if the preference command has a match within the state table. If the answer is no, this may mean that in order for a full match to be found in the state table, it may take more than one reference command in order to represent one system command. For example, in voice messaging systems, some systems allow the deletion of a message with one key push on a DTMF dialing pad where as others require the actuation of two keys or sometimes even three keys before the message will be deleted.

If the answer is no in decision block 303, decision block 304 determines if another preference command is needed according to the state table in order to result in a system command. If the answer is yes, control is transferred back to block 302. If the answer in decision block 304 is no, block 307 performs error recovery. It may well be that this particular information system does not provide the desired function that the user is attempting to actuate or the user may have simply made a mistake.

Returning to decision block 303, if the answer is yes, block 306 executes the resulting system command obtained from the state table. Finally, decision block 308 determines if the information request is done. For example, this can be the result of the user hanging up the telephone or by inputting an input which signals that the information request is over. If the answer in decision block 308 is no, control is transferred back to block 302. If the answer is yes, control is transferred back to decision block 202 of FIG. 2.

Figure 4:
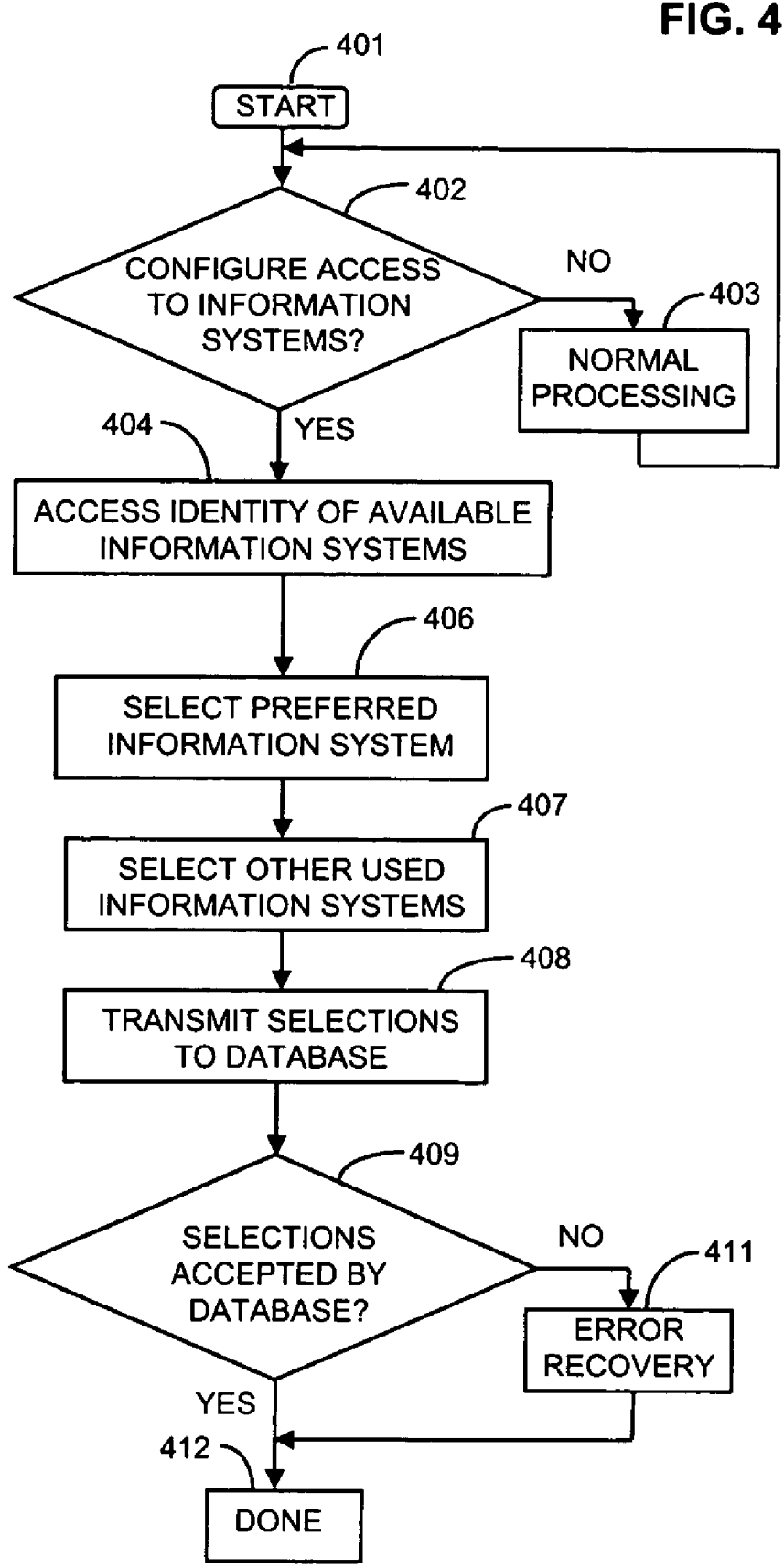
FIG. 4 illustrates, in flowchart form, operations performed by an embodiment of a unit utilized to establish information system preferences for a user.

FIG. 4 illustrates, in flowchart form, operations performed by an embodiment of a device utilized by a user to determine their preferred system in database 114. This device may be a personal computer, such as personal computer 113 of FIG. 1, or may be any other type of device that can be utilized for this purpose such as a cellular telephone or a personal digital assistant. Once started in block 401, decision block 402 determines if the operation to be performed by the device is to configure access to information systems. If the answer is no, block 403 performs whatever normal processing is done by the device. If the answer in decision block 402 is yes, block 404 accesses the identity of the available information systems for the user from database 114. In block 406, the user selects the preferred information system. By selecting the preferred information system, the user determines the operations that will be utilized to access the other information systems. Next, in block 407, the user selects the other systems used by the user. Finally, the device transmits the selections to the database in block 408. The device determines in decision block 409 whether the selections have been accepted by the database. The database performs a concurrent operation in verifying that the selected information systems are indeed available and that the user is authorized to utilize these systems. If the decision in decision block 409 is no, control is transferred to block 411 which performs error recovery before transferring control to block 412. If the answer in decision block 409 is yes, the operations are done as indicated by block 412.

Figure 5:
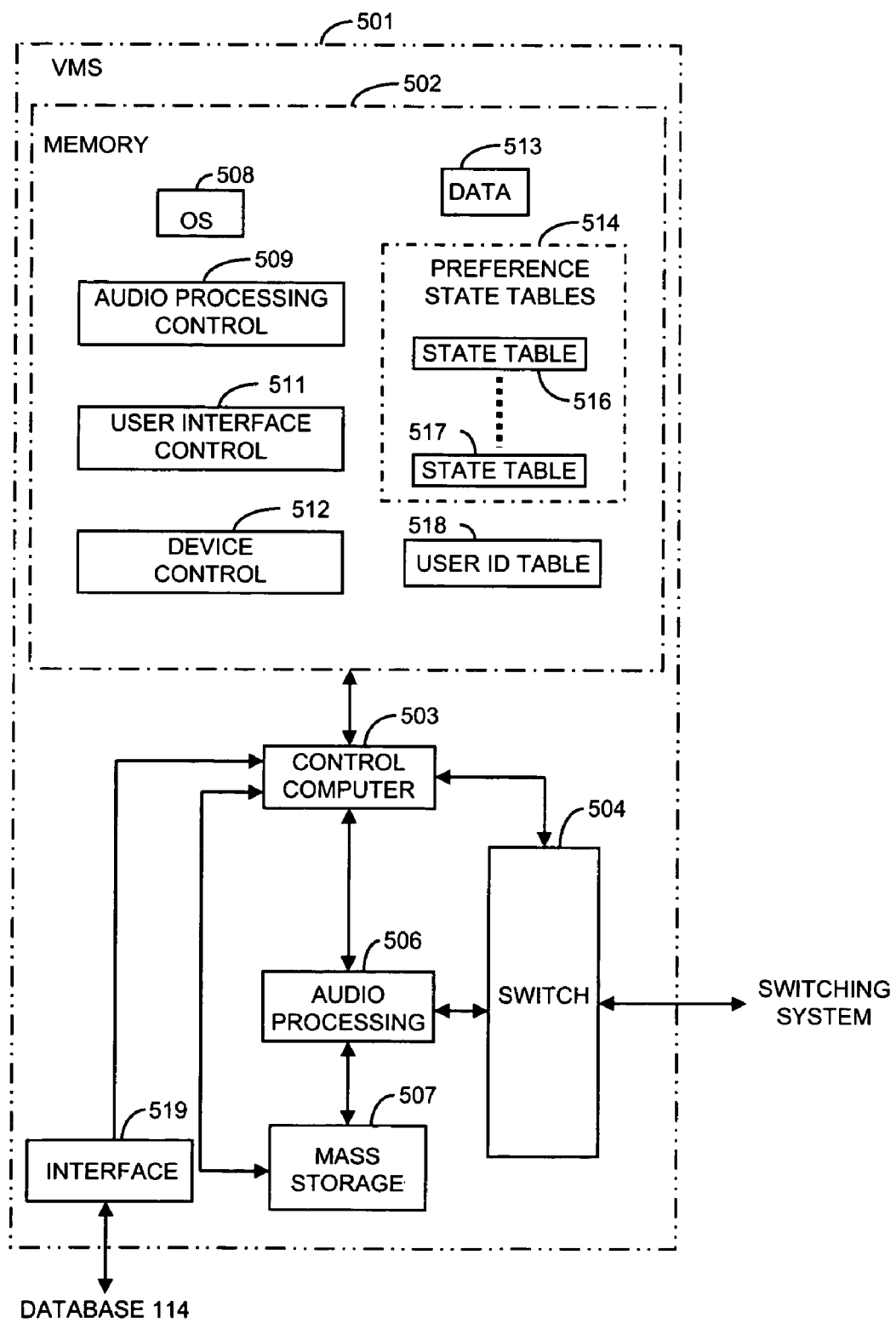
FIG. 5 illustrates, in block diagram form, an embodiment of an information system.

FIG. 5 illustrates a block diagram of a voice messaging system 501. Overall control of voice messaging system 501 is performed by control computer 503 executing programs and utilizing data stored in memory 502. Operating system 508 provides the overall control. Audio processing control application 509 controls the processing and response to audio information which is received from audio processing unit 506. User interface control application 511 is responsible for interpreting and performing the actions required by the user as the user inputs this control information via switch 504 from the switching system as was described with respect to FIG. 1. The switching system listed in FIG. 5 can be switching system 104, 102 or 103 of FIG. 1. Device control application 512 provides the lower level control for switch 504, audio processing 506 and mass storage 507.

Audio processing unit 506 performs the audio processing such as conversion of audio information to digital information and digital information to audio information. In addition, audio processing unit 506 also performs the conversion of DTMF signals being received from the switching system via switch 504. As is well known to those skilled in the art, audio processing unit 506 may comprise a plurality of digital signal processors for performing the audio processing task.

After being converted to digital form by audio processing unit 506, voice messages are stored in mass storage 507 under control of control computer 503. Control computer 503 can also utilize storage within mass storage 507 for other types of information. Interface 519 under control of control computer 503 provides an interface to database 114 such that control computer 503 can access and store information on database 114.

Switch 504 is responsible for both digital and audio information being received from the switching system to properly route this to the various subunits of audio processing unit 506 as well as to route switching information to control computer 503. The operation and construction of switch 504 is well known to those skilled in the art. The interconnection between the switching system and switch 504 may be a plurality of various types of telecommunication links as is well known in the art.

As was described with respect to the operations of FIG. 2, when control computer 503 receives a request for information via switch 504 and/or audio processing unit 506, control computer 503 determines if the user attempting to obtain information is listed in user ID table 518. If the answer is yes, control computer 503 accesses database 114 to ascertain that the user has preferences stored within database 114. If this is true, control computer 503 accesses the state table representing the user's preference from database 114 and stores this state table in preference state table 514 which is illustrated as consisting of a plurality of state tables 516 through 517. There is one state table in preference state table 514 for each user who is actively requesting information from voice mail system 501.

When the operations of an information system are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The information system can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance, via optical scanning of the paper or other medium, then compiled, interpreted or otherwise processed in a suitable manner if necessary, and then stored in a computer memory.

In an alternative embodiment, where the information system is implemented in hardware, the information system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method of determining operational preferences for a user access to a plurality of telecommunication response systems, comprising the steps of:

designating by the user that user operations of a first one of the plurality of telecommunication response systems will be the operational preferences of the user for all of the plurality of telecommunication response systems;

storing the operational preferences for the user;

accessing the stored operational preferences by a second one of the plurality of telecommunication response systems for use in directly communicating with the user during interactions with the user by the second one of plurality of telecommunication response systems; and interpreting user operations by the second one of plurality of telecommunication response systems using the accessed operational preferences wherein the user operations interpreted by the second one of the plurality of telecommunication response systems are not communicated via the first one of the plurality of telecommunication response systems.

2. The method of claim 1 wherein the step of designating comprises the steps of identifying the first one of the plurality of telecommunication response systems by the user; and
specifying the other ones of the plurality of telecommunication response systems by the user.

3. The method of claim 2 wherein the steps of identifying and specifying use a telephone.

4. The method of claim 2 wherein the steps of identifying and specifying use at least one of a personal computer or personal digital assistant.

5. The method of claim 1 wherein the step of storing comprises the step of storing the operational preferences in a database.

6. The method of claim 5 wherein the step of accessing comprises the step of obtaining the operational preferences from the database.

7. The method of claim 5 wherein the step of accessing comprises the step of transmitting the operational preferences to the other telecommunication response systems by the database in response to the step of storing the operational preferences in the database.

8. The method of claim 1 wherein the step of accessing is performed each time the user communicates with the second one of the plurality of telecommunication response systems.

9. The method of claim 1 wherein the step of accessing is performed only a first time the user communicates with the second one of the plurality of telecommunication response systems.

10. A method of determining operational preferences for a user access to a plurality of telecommunication response systems, comprising the steps of:
designating on a device by the user that user operations of one of the plurality of telecommunication response systems will be the operational preferences of the user for all of the plurality of telecommunication response systems;
transmitting by the device the designation to the other ones of the telecommunication response systems;
storing the operational preferences;
accessing the stored operational preferences by a second one of the plurality of telecommunication response systems for use in communicating with the user during interactions with the user by the second one of plurality of telecommunication response systems; and
interpreting user operations by the second one of plurality of telecommunication response systems using the accessed operational preferences.

11. The method of claim 10 wherein the device is at least one of a personal computer, telephone or personal digital assistant.

12. The method of claim 10 wherein the step of designating comprises the steps of identifying the one of the plurality of telecommunication response systems by the user; and
specifying the other ones of the plurality of telecommunication response systems by the user.

13. The method of claim 10 wherein the step of accessing is performed each time the user communicates with the second one of the plurality of telecommunication response systems.

14. The method of claim 10 wherein the step of accessing is performed only a first time the user communicates with the second one of the plurality of telecommunication response systems.

15. A tangible processor-readable medium for determining operational preferences for a user access to a plurality of telecommunication response systems, comprising processor-executable instructions configured:
designating by the user that user operations of a first one of the plurality of telecommunication response systems will be the operational preferences of the user for all of the plurality of telecommunication response systems;
storing the operational preferences for the user;
accessing the stored operational preferences by a second one of the plurality of telecommunication response systems for use in directly communicating with the user during interactions with the user by the second one of plurality of telecommunication response systems; and
interpreting user operations by the second one of plurality of telecommunication response systems using the accessed operational preferences wherein the user operations interpreted by the second one of the plurality of telecommunication response systems are not communicated via the first one of the plurality of telecommunication response systems.

16. The processor-readable medium of claim 15 wherein the processor-readable medium for designating comprises processor-readable medium for identifying the first one of the plurality of telecommunication response systems by the user; and
specifying the other ones of the plurality of telecommunication response systems by the user.

17. The processor-readable medium of claim 16 wherein the processor-readable medium for identifying and specifying use a telephone.

18. The processor-readable medium of claim 16 wherein the processor-readable medium for identifying and specifying use at least one of a personal computer or personal digital assistant.

19. The processor-readable medium of claim 15 wherein the processor-readable medium for storing comprises processor-readable medium for storing the operational preferences in a database.

20. The processor-readable medium of claim 19 wherein the processor-readable medium for accessing comprises processor-readable medium for obtaining the operational preferences from the database.

21. The processor-readable medium of claim 19 wherein the processor-readable medium for accessing comprises processor-readable medium for transmitting the operational preferences to the other telecommunication response systems by the database in response to the processor-readable medium for storing the operational preferences in the database.

22. The processor-readable medium of claim 15 wherein the processor-readable medium for accessing is performed each time the user communicates with the second one of the plurality of telecommunication response systems.

23. The processor-readable medium, of claim 15 wherein the processor-readable medium for accessing is performed only a first time the user communicates with the second one of the plurality of telecommunication response systems.

24. A tangible processor-readable medium of determining operational preferences for a user access to a plurality of telecommunication response systems, comprising processor-executable instructions configured:
designating on a device by the user that user operations of one of the plurality of telecommunication response systems will be the operational preferences of the user for all of the plurality of telecommunication response systems;

transmitting by the device the designation to the other ones of the telecommunication response systems;
storing the operational preferences;
accessing the stored operational preferences by a second one of the plurality of telecommunication response systems for use in communicating with the user during interactions with the user by the second one of plurality of telecommunication response systems; and
interpreting user operations by the second one of plurality of telecommunication response systems using the accessed operational preferences.

25. The processor-readable medium of claim 24 wherein the device is at least one of a personal computer, telephone or personal digital assistant.

26. The processor-readable medium of claim 24 wherein the processor-readable medium for designating comprises processor-readable medium for identifying the one of the plurality of telecommunication response systems by the user; and
specifying the other ones of the plurality of telecommunication response systems by the user.

27. The processor-readable medium of claim 24 wherein the processor-readable medium for accessing is performed each time the user communicates with the second one of the plurality of telecommunication response systems.

28. The processor-readable medium of claim 24 wherein the processor-readable medium for accessing is performed only a first time the user communicates with the second one of the plurality of telecommunication response systems.

29. Apparatus for implementing the steps of claim 1.

30. Apparatus for implementing the steps of claim 2.

31. Apparatus for implementing the steps of claim 8.

32. Apparatus for implementing the steps of claim 9.

* * * * *